No. 635,535. Patented Oct. 24, 1899.
F. W. FRERICHS.
APPARATUS FOR TESTING LIQUID ANHYDROUS AMMONIA.
(Application filed Nov. 5, 1898.)
(No Model.) 2 Sheets—Sheet 1.
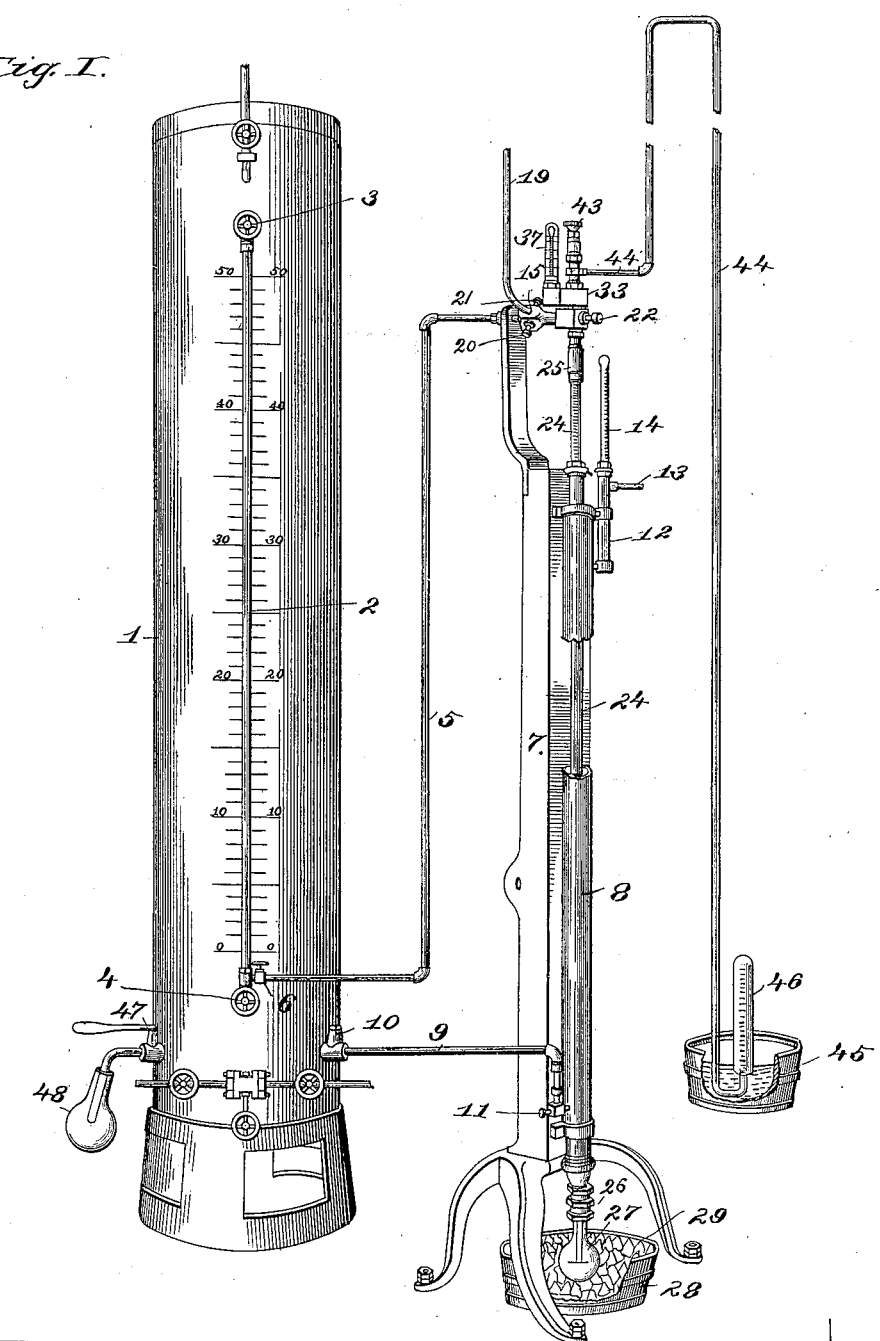
Fig. I.
Witnesses
Inventor
Fred. W. Frerichs
By Knight Bro
Attorneys.

No. 635,535. Patented Oct. 24, 1899.
F. W. FRERICHS.
APPARATUS FOR TESTING LIQUID ANHYDROUS AMMONIA.
(Application filed Nov. 5, 1898.)
(No Model.) 2 Sheets—Sheet 2.
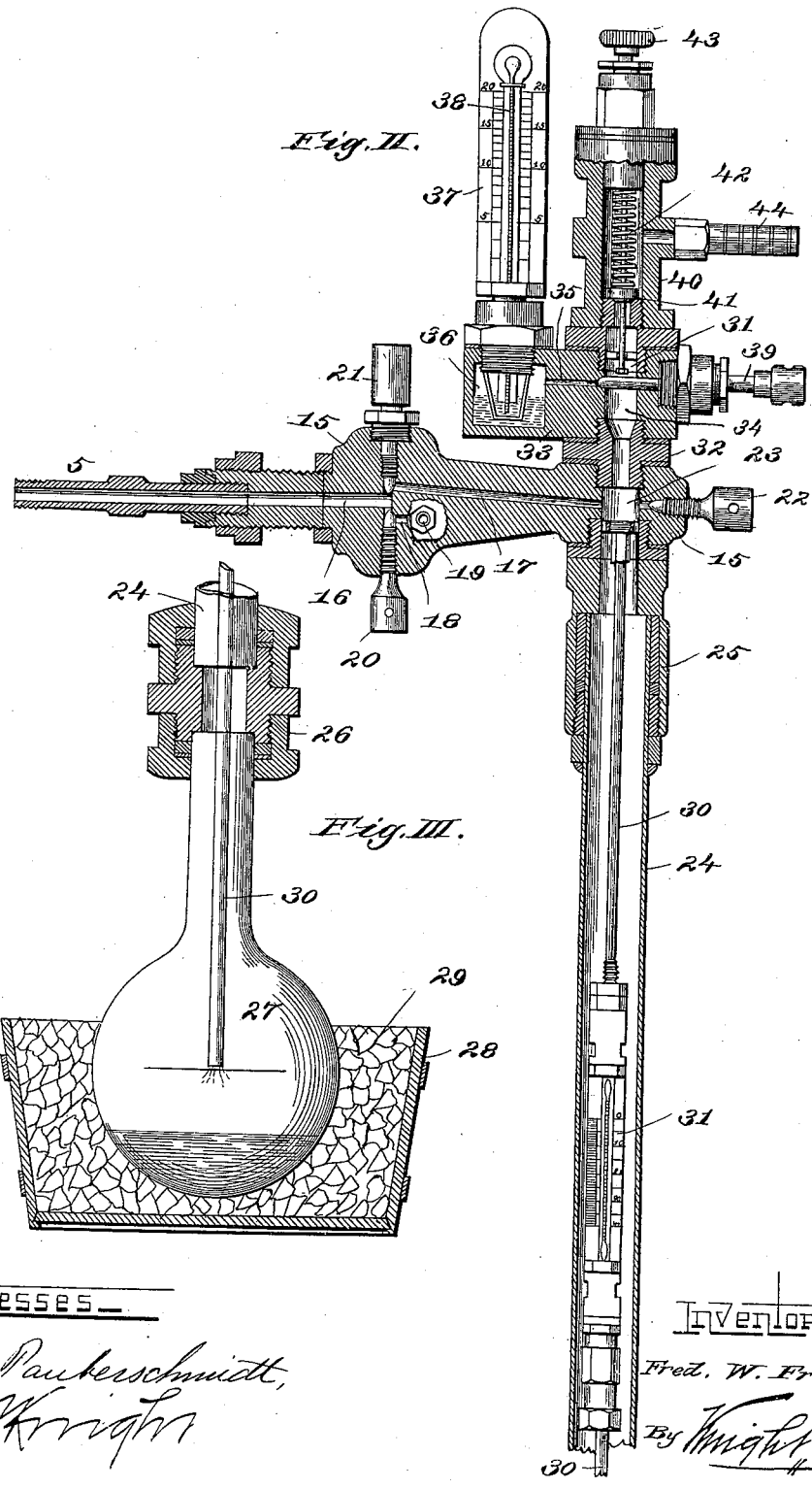

UNITED STATES PATENT OFFICE.

FREDERICK W. FRERICHS, OF ST. LOUIS, MISSOURI.

APPARATUS FOR TESTING LIQUID ANHYDROUS AMMONIA.

SPECIFICATION forming part of Letters Patent No. 635,535, dated October 24, 1899.

Application filed November 5, 1898. Serial No. 695,566. (No model.)

*To all whom it may concern:*

Be it known that I, FREDERICK W. FRERICHS, a citizen of the United States, residing at the city of St. Louis, in the State of Missouri, have invented certain new and useful Improvements in Apparatus for Testing Liquid Anhydrous Ammonia, of which the following is a full, clear, and exact description, reference being had to the accompanying drawings, forming part of this specification.

My invention relates to an apparatus for use in testing commercial liquid anhydrous ammonia in such manner as to obtain a more perfect test than has generally resulted in the heretofore common manner of carrying out such tests for the purpose of determining the purity of the chemical.

My invention consists in features of novelty hereinafter fully described, and pointed out in the claims.

The testing of commercial liquid anhydrous ammonia is generally accomplished by drawing off a small sample into a flask and evaporating same in the open air under atmospheric pressure. In so doing the ammonia is considered to be of sufficient purity if it fully evaporates, leaving no residue in the flask at the pressure of the atmosphere and at the temperature of the surrounding air. It has been frequently found that liquid anhydrous ammonia fulfilling this test to satisfaction for some purposes is unsatisfactory in ice-machines owing to the fact that the evaporation in ice-machines takes place at a very low temperature and under high pressure, and it has often been found that liquefied ammonia will not fully evaporate under such conditions prevailing in ice-machines where the evaporation in the common test-flask was satisfactory. Furthermore, it seems to be an established fact that ammonia absorbs the permanent gases which develop from ammonia in ice-machines and counteract the working of the plant, and so far there has been no method practicable which served to detect such permanent gases contained in the ammonia.

My testing apparatus has for its object to make it possible to test the ammonia by evaporating same under conditions prevailing in ice-machines, thereby collecting the solid and liquid substances contained in same, the apparatus at the same time allowing for the collection of the permanent gases in solution in the ammonia.

Figure I is a side elevation of my testing apparatus. Fig. II is an enlarged sectional view of the conducting and regulating portion of the apparatus. Fig. III is an enlarged detail view of the test-flask and the lower ends of the parts to which it is connected, together with the vessel containing the freezing mixture, in which said flask is seated.

1 designates a receiver that contains the liquid anhydrous ammonia to be tested. This receiver is provided with a gage-tube 2 in connection with a graduated scale, said tube having communication with the interior of the receiver by valves 3 and 4.

5 designates a pipe leading from the receiver 1, the passage-way in which is controlled by a valve 6.

7 designates a frame, and mounted on this frame is a Liebig condenser-jacket 8, that is provided with communication to the receiver 1 by means of a pipe 9, containing valves 10 and 11. The pipe 9 is used to convey liquid ammonia from the receiver to the condenser, in which condenser the ammonia in evaporation is used as a cooling medium.

In order to obtain the evaporation of the ammonia that flows into the condenser-jacket 8, communication with the atmosphere is provided by means of an outlet-tube 12, provided with a discharge-pipe 13 and surmounted by a thermometer 14, that indicates the temperature of the evaporating ammonia. The pipe 5 leads to the upper end of the frame 7 and is supported in said frame in communication with a coupling 15. This coupling is provided with channels 16 and 17, offset from each other. The channel 16 terminates in a cross-channel that leads to a duct 18, in communication with an outlet-pipe 19. The entrance to the duct 18 is controlled by a valve 20, which when open permits the ammonia flowing through the pipe 5 and channel 16 to pass to the pipe 19 and thence to a suitable absorbing apparatus. Communication between the channels 16 and 17 is controlled by a valve 21, located at the junction of said channels. In line with the channel 17 at the end of the coupling 15 is a plug 22, that closes a channel in the end of the coupling. The channel 17 opens into a chamber 23 in the coupling 15.

Within the shell of the condenser-jacket 8 is a worm 24, preferably of glass, that is connected in an air-tight manner to the coupling 15 by means of a stuffing-boxing 25. This worm 24 extends to the bottom of the condenser-jacket, where its lower end is connected by a stuffing-boxing 26 to a test-flask 27. This test-flask is of transparent material, preferably infusible glass, and it is seated in a vessel 28. The vessel 28 is designed to be filled with a freezing mixture, preferably of fresh ice combined with salt, through means of which the evaporation of the ammonia in the flask is accomplished by raising the temperature of the liquid ammonia entering the flask. The rapidity of the evaporation may be regulated according to the condition of the freezing mixture and the manner in which the flask is embedded therein.

30 designates a pipe the upper end of which extends to the chamber 23 in the coupling 15, so that said pipe is in communication with said chamber and the channel 17. This pipe 30 extends down through the worm 24 into the test-flask 27, where its lower end is open to the interior of said flask. On the pipe 30 is a thermometer 31, designed to indicate the temperature of the ammonia flowing through the pipe to the test-flask. Above the coupling 15 is a nipple-piece 32, that connects a body 33 to the coupling. In this body 33 is a chamber 34, that is in communication with the chamber 23 by the passage-way through said nipple-piece. In the body 33 is also a channel 35, that leads to a well 36, containing a quantity of mercury. The channel 35 is controlled by a valve 39. Mounted on the body 33 is a gage 37, provided with a mercury-tube 38. The lower end of this mercury-tube is open and extends down into the well 36 and into the mercury contained therein. This mercury-gage is designed to indicate the pressure prevailing in the interior of the apparatus by reason of such pressure being exerted against the mercury in said well to force it into the tube 38. Mounted on the body 33 above the chamber 34 is a valve-casing 40, that contains a valve 41, held to a seat at the bottom of the casing by a spring 42. The tension of the spring 42 is regulated by an adjusting-screw 43. This spring-controlled valve 41 is held to its seat except at such times as the pressure of evaporated ammonia-gas within the apparatus ascending through the condenser becomes great enough to overcome the tension of the spring 42 and allow the ammonia-gases to escape into the interior of said valve-casing 40, from which they pass into a pipe 44. The pipe 44 leads to a vessel 45, containing water, where its upturned end terminates under the water and is inclosed within the lower open end of a graduated glass gasometer-tube 46, the upper end of which is closed. This gasometer-tube 46 is designed to receive for observation any foreign gases that may have been present in the liquid ammonia, owing to the fact that such gases rise through the water into said tube, where they may be seen, while the ammonia-gases combine with and are absorbed by the water in said vessel.

47 is a faucet through which ammonia may be drawn from the receiver 1 into a hand test-flask 48 to test it in the usual manner.

The operation of the test apparatus is obvious from the description of the parts and is as follows: The receiver 1, Fig. I, being filled with liquefied ammonia, valves 10 and 11 are opened, liquefied ammonia is admitted through the pipe 9 to the condenser-jacket 8, where it evaporates and escapes through tube 12 and pipe 13, the thermometer 14 indicating the temperature which prevails in the condenser. Sufficient ammonia is admitted through the valve 11 to establish in the condenser the desired temperature, which is maintained as stationary as possible during the entire test. A freezing mixture is put into the vessel containing the flask 27, and the graduated glass tube 46, filled with water, is put over the open end of the pipe 44, which terminates under the water-level contained in the vessel 45. All valves of the testing apparatus being closed, with only the exception of valve 39, the apparatus is ready for use. Valves 3 and 4, which connect the gage-tube 2 with the receiver, are left closed, and valve 6 is opened, whereby connection is made between the testing apparatus and the liquefied ammonia contained in the gage-tube 2, which, carrying the graduation from "0" to "50," now serves as a measure for the liquefied ammonia which is to be tested. By opening valve 20 some ammonia may be blown off through pipe 19, and the level of the ammonia may be lowered to any desired mark. After this is done valve 20 is closed, and by operating valve 21 such quantities of ammonia may be admitted through channel 17, chamber 23, and pipe 30 into flask 27 of the testing apparatus as may be found convenient for the test. The quantity of ammonia admitted can be ascertained by the graduation on the gage-tube 2. The evaporation of the ammonia in flask 27 begins at once, and by means of the screw 43, which presses on spring 42 in the upper part of the testing apparatus to hold the valve 41 to its seat, the pressure under which the evaporation of the ammonia is to take place may be regulated to the desired degree, which is indicated by the mercury-gage 37. The evaporating ammonia-gas escapes from the flask 27 through the inside worm 24 of the condenser, where its temperature is kept low by the surrounding cooling medium, and the temperature of the evaporating ammonia, after it has passed the condenser, may be ascertained by the thermometer 14, the graduation of which indicates the degree Fahrenheit below zero. The object in passing the ammonia vapors through the condenser is to recondense and to lead back into flask 27 all foreign substances that possibly might be contained in the ammonia and which may evaporate together with the ammonia during the test, thus making certain that only pure ammonia can leave the testing apparatus. The ammonia-gas which has evaporated in flask 27 under exactly the same conditions which prevail in ice-machines—namely, under a pressure of from fifteen to twenty pounds to the square inch (which is equivalent to the back pressure) and at a temperature of about zero (which resembles the temperature of evaporation of the ammonia in freezing-coils)— passes the valve 41 and escapes through the pipe 44 into the water contained in the vessel 45, where it is absorbed and separated from the permanent gases. In the graduated gasometer-tube 46 all permanent gases are collected, precaution being taken that tube 46 is not put over the pipe 44 until all air contained in the testing apparatus has been replaced by ammonia-gas, which is easily done in the familiar way. When all the ammonia which has been admitted for a sample into the flask 27 has been evaporated, a new sample may be admitted into the flask by operating the valve 21, the apparatus being in the same condition in which it was at the beginning of the test, except that the flask 27 now contains whatever impurities may have been left from the evaporation of the first test. In this way an unlimited number of tests may be made in succession, and an unlimited amount of ammonia may be evaporated in the small flask 27, in which remain at the end of the tests all the non-volatile impurities which have been contained in a very large amount of ammonia.

I claim as my invention—

1. An apparatus for testing liquid ammonia comprising a receiver, a condenser having a jacket and worm, means of communication between said receiver and said jacket, a pipe extending through said worm, a test-flask into which said pipe is adapted to empty, and a means of communication between said receiver and said worm; substantially as described.

2. An apparatus for testing liquid ammonia comprising a receiver, a condenser having a jacket and worm, means of communication between said receiver and said jacket, a test-flask having communication with said worm, a means of communication between said receiver and said worm, a valve-casing provided with a chamber, a spring-controlled valve located in said chamber, a vessel for liquid, means of communication between said chamber and said vessel, and a gage-tube arranged in said vessel in connection with said means of communication leading thereto; substantially as described.

3. An apparatus for testing liquid ammonia comprising a receiver, a condenser having a jacket and worm, a pipe leading to said jacket, a pipe leading to said worm, a pipe arranged in said worm and leading therethrough, a test-flask located at the lower end of the worm, a vessel adapted to contain liquid, a pipe having communication with said worm and leading to said vessel, and a gage-tube located in said vessel over the open end of the last-named pipe; substantially as described.

4. An apparatus for testing liquid ammonia comprising a receiver, a condenser having a jacket and worm, means of communication between said receiver and said jacket, a gage-tube mounted on said receiver, and having communication therewith, valves for closing communication between said receiver and said gage-tube, a pipe leading from said gage-tube to said worm, and a test-flask having communication with said worm; substantially as described.

FREDERICK W. FRERICHS.

In presence of—
  E. S. KNIGHT,
  N. V. ALEXANDER.